(12) United States Patent
Yao

(10) Patent No.: US 8,320,103 B2
(45) Date of Patent: Nov. 27, 2012

(54) DIELECTRIC CERAMIC AND LAMINATED CERAMIC CAPACITOR

(75) Inventor: Takayuki Yao, Higashiomi (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 386 days.

(21) Appl. No.: 12/820,309

(22) Filed: Jun. 22, 2010

(65) Prior Publication Data

US 2011/0019333 A1    Jan. 27, 2011

(30) Foreign Application Priority Data

Jul. 22, 2009    (JP) .................................. 2009-171011

(51) Int. Cl.
*H01G 4/06*    (2006.01)
*C04B 35/00*   (2006.01)

(52) U.S. Cl. .................... 361/321.4; 361/321.5; 501/137

(58) Field of Classification Search .... 361/321.1–321.5; 501/137–139
See application file for complete search history.

(56) References Cited

U.S. PATENT DOCUMENTS

| | | | |
|---|---|---|---|
| 5,225,960 A * | 7/1993 | Kishi et al. | 361/321.5 |
| 5,977,006 A * | 11/1999 | Iguchi et al. | 501/137 |
| 6,614,644 B2 * | 9/2003 | Chazono et al. | 361/321.2 |
| 6,853,536 B2 | 2/2005 | Nakamura et al. | |
| 2001/0021095 A1 * | 9/2001 | Mizuno et al. | 361/311 |
| 2001/0055193 A1 * | 12/2001 | Chazono et al. | 361/311 |

FOREIGN PATENT DOCUMENTS

| | | |
|---|---|---|
| JP | 10330160 A | 12/1998 |
| JP | 2000-335966 A | 12/2000 |
| JP | 2001-230148 A | 8/2001 |
| JP | 2004-224653 A | 8/2004 |

* cited by examiner

*Primary Examiner* — Eric Thomas
(74) *Attorney, Agent, or Firm* — Dickstein Shapiro LLP

(57) ABSTRACT

A dielectric ceramic which is capable of achieving a laminated ceramic capacitor with high reliability, in particular, favorable lifetime characteristics in a load test, even when a dielectric ceramic layer is reduced in thickness, contains one of $Ba(Ti, Mn)O_3$ and $(Ba, Ca)(Ti, Mn)O_3$ as a main component, and R (La, Ce, Pr, Nd, Sm, Eu, Gd, Tb, Dy, Ho, Er, Tm, Yb, Lu, and/or Y), M (Fe, Co, V, W, Cr, Mo, Cu, Al, and/or Mg) and Si as accessory components. The area of a region in which at least one of R and M is present is 10% or less on average on a cross section of each main component grain.

20 Claims, 2 Drawing Sheets

DIELECTRIC CERAMIC AND LAMINATED CERAMIC CAPACITOR

BACKGROUND OF THE INVENTION

1. Field of the Invention

The invention relates to a dielectric ceramic and a laminated ceramic capacitor, and more particularly, relates to a dielectric ceramic suitable for use in a thin-layer high-capacity laminated ceramic capacitor, and to a laminated ceramic capacitor made using the dielectric ceramic.

2. Description of the Related Art

As one of effective means for satisfying the needs for size reduction and higher capacity in laminated ceramic capacitors, the dielectric ceramic layers provided in the laminated ceramic capacitors are sometimes reduced in thickness. However, as the dielectric ceramic layers become thinner and thinner, the electric field intensity per dielectric ceramic layer is increased. Therefore, a higher reliability, in particular, a higher lifetime characteristics in a load test is required for the dielectric ceramic used.

$BaTiO_3$ based dielectric ceramics are often used as the dielectric ceramics constituting dielectric ceramic layers of laminated ceramic capacitors. In order to improve the reliability and various electric properties of the $BaTiO_3$ based dielectric ceramics, elements such as rare-earth elements and Mn have been added as accessory components.

For example, Japanese Patent Application Laid-Open No. 10-330160 (Patent Document 1) discloses, for the purpose of improving the dielectric breakdown voltage, a dielectric ceramic which has a core-shell structure and contains $ABO_3$ (A always contains Ba, and may further contain at least one of Ca and Sr, while B always contains Ti, and may further contain at least one of Zr, Sc, Y, Gd, Dy, Ho, Er, Yb, Tb, Tm, and Lu) as its main component, and in the dielectric ceramic, at least one of Mn, V, Cr, Co, Ni, Fr, Nb, Mo, Ta, and W is substantially homogeneously distributed through the grains. In addition, Patent Document 1 discloses an example in which Mg is used as a shell component and Mg is distributed only in the shell portion, but not in the core.

However, even when the dielectric ceramic described in Patent Document 1 mentioned above is used, the reliability, and in particular, the lifetime characteristics in a load test, may be insufficient as the dielectric ceramic layers are further reduced in thickness, and therefore, further improvements have been desired.

SUMMARY OF THE INVENTION

Thus, some of the objects of the present invention is to provide a dielectric ceramic which is capable of achieving high reliability even when the dielectric ceramic layer is reduced in thickness, and to provide a laminated ceramic capacitor made with the dielectric ceramic.

The present invention is first directed to a dielectric ceramic containing one of $Ba(Ti, Mn)O_3$ and $(Ba, Ca)(Ti, Mn)O_3$ as a main component; and R (R is at least one selected from La, Ce, Pr, Nd, Sm, Eu, Gd, Tb, Dy, Ho, Er, Tm, Yb, Lu, and Y), M (M is at least one selected from Fe, Co, V, W, Cr, Mo, Cu, Al, and Mg), and Si as accessory components. In order to solve the above-mentioned technical problem, the dielectric ceramic of the invention has a feature that the ratio of the area of a region in which at least one of R and M is present is 10% or less on average on a cross section of each main component grain.

In a dielectric ceramic according to the present invention, the Mn content ratio is preferably 0.01 to 1 mol % with respect to all of (Ti, Mn) sites.

The Ca content ratio is preferably 15 mol % or less with respect to all of (Ba, Ca) sites.

The present invention is also directed to a laminated ceramic capacitor including a capacitor main body including a plurality of stacked dielectric ceramic layers and a plurality of internal electrodes formed along specific interfaces between the dielectric ceramic layers; and a plurality of external electrodes formed in positions different from each other on an external surface of the capacitor main body and electrically connected to specific one of the internal electrodes.

The laminated ceramic capacitor according to the invention has a feature that the dielectric ceramic layers are composed of the dielectric ceramic according to the invention.

In the dielectric ceramic according to the invention, Mn is present homogeneously as a solid solution in the main component grains, thereby improving the insulating property in the main component grains. In this case, the ratio of the solid solution region with the R component and/or M accessory components therein is 10% or less, and local grain growth can thus be suppressed on firing. Therefore, when a laminated ceramic capacitor is constructed with the use of the dielectric ceramic according to the invention, the fired dielectric ceramic layers can be made smoother. This is advantageous for a reduction in the thickness of the laminated ceramic capacitor, and high reliability, in particular, favorable lifetime characteristics in a load test can be maintained even in the thinned laminated ceramic capacitor.

No local grain growth is caused when Mn only is present homogeneously as a solid solution in the main component grains. However, it is believed that the local grain growth is likely to be caused when Mn is present homogeneously as a solid solution in the main component grains, and R and/or M is/are present in the main component grains. In this regard, when the ratio of the solid solution region with the R component and/or M component therein is 10% or less, it is expected that local grain growth may be suppressed.

In the dielectric ceramic according to the invention, when the main component is $(Ba, Ca)(Ti, Mn)O_3$, that is, when Ca is present as a solid solution at Ba sites, the action of suppressing the local grain growth is further enhanced, and the reliability is further improved.

In the dielectric ceramic according to the invention, the lifetime characteristics can be further improved when the Mn content ratio is 0.01 to 1 mol % with respect to all of (Ti, Mn) sites.

In addition, when the Ca content ratio is 15 mol % or less with respect to all of (Ba, Ca) sites in the dielectric ceramic according to the invention, the lifetime characteristics can be further improved.

DETAILED DESCRIPTION OF THE INVENTION

Figure 1:
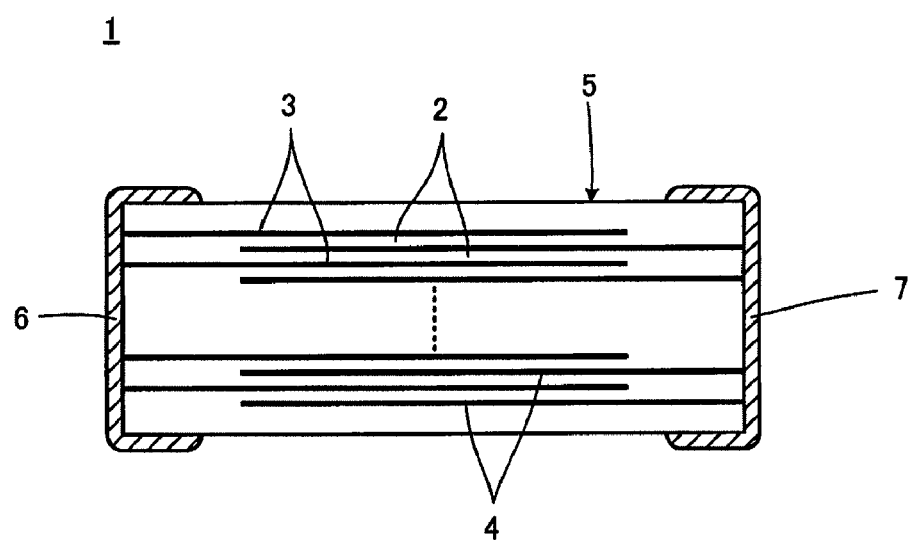
FIG. 1 is a cross sectional view schematically illustrating a laminated ceramic capacitor 1 composed with the use of a dielectric ceramic according to the invention.

With reference to FIG. 1, a laminated ceramic capacitor 1 with a dielectric ceramic according to the invention applied will be described first.

The laminated ceramic capacitor 1 includes a capacitor main body 5 composed of a plurality of stacked dielectric ceramic layers 2 and of a plurality of internal electrodes 3 and 4 formed along interfaces between the dielectric ceramic layers 2. The internal electrodes 3 and 4 may contain, for example, Ni as their main component.

First and second external electrodes 6 and 7 are formed in positions different from each other on an external surface of the capacitor main body 5. The external electrodes 6 and 7 may contain, for example, Ag or Cu as their main component. In the laminated ceramic capacitor 1 shown in FIG. 1, the first and second external electrodes 6 and 7 are formed on end surfaces of the capacitor main body 5 opposed to each other. As for the internal electrodes 3 and 4, the plurality of internal electrodes 3 and the plurality of internal electrodes 4 are electrically connected respectively to the first external electrode 6 and the second external electrode 7, and the first and second internal electrodes 3 and 4 are arranged alternately with respect to the stacking direction.

It is to be noted that the laminated ceramic capacitor 1 may be a two-terminal laminated ceramic capacitor provided with the two external electrodes 6 and 7, or may be a multi-terminal laminated ceramic capacitor provided with a number of external electrodes.

In this laminated ceramic capacitor 1, the dielectric ceramic layers 2 are composed of a dielectric ceramic containing a Ba (Ti, Mn)$O_3$ or (Ba, Ca) (Ti, Mn)$O_3$ as its main component, and R (R is at least one selected from La, Ce, Pr, Nd, Sm, Eu, Gd, Tb, Dy, Ho, Er, Tm, Yb, Lu, and Y), M (M is at least one selected from Fe, Co, V, W, Cr, Mo, Cu, Al, and Mg) and Si as accessory components.

Figure 2:
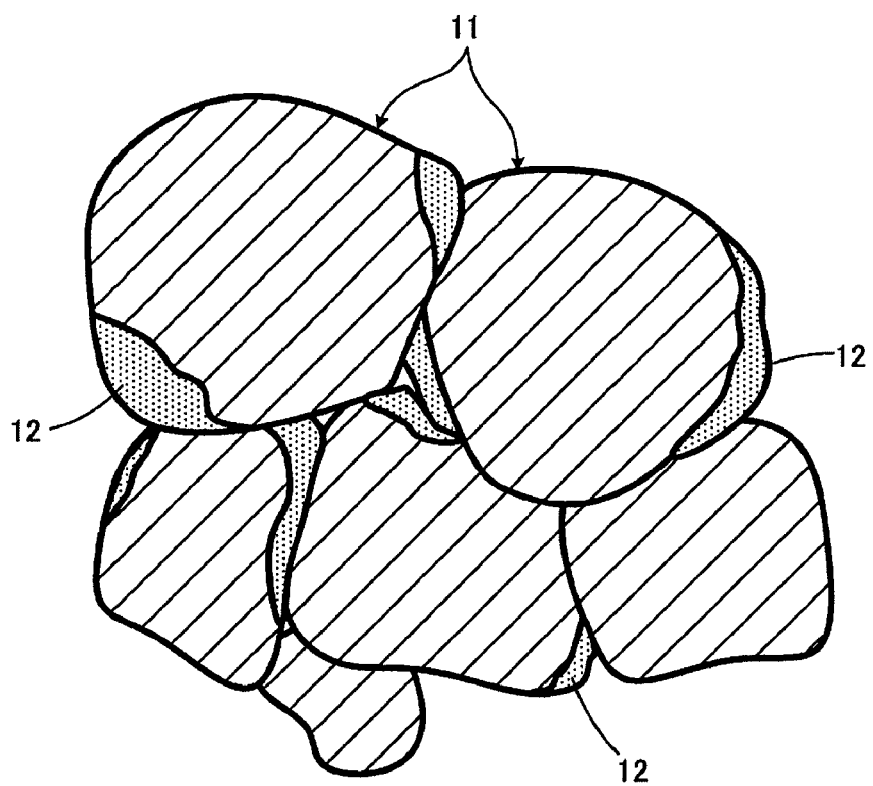
FIG. 2 is a cross sectional view schematically illustrating main component grains 11 of a dielectric ceramic according to the invention.

FIG. 2 shows a cross sectional schematic view of main component grains 11 of the dielectric ceramic. Referring to FIG. 2, Mn is present homogeneously as a solid solution in most regions of the main component grains 11 as described above. On the other hand, R and M are not present as a solid solution in the main component grains 11. More specifically, the region in which at least one of R and M is present (hereinafter, referred to as an "R/M region") 12 is formed on the surface portion of the main component grains 11. However, the R/M region 12 is not sufficient to form a thin shell in a concentric fashion with the main component grains 11. Therefore, the main component grains 11 are not adapted to constitute a core-shell structure, unlike the case of the dielectric ceramic described in Patent Document 1 mentioned above.

The dielectric ceramic constituting the dielectric ceramic layers 2 has a feature that the average ratio of the area of the R/M region 12 on a cross section of each main component grain 11 is 10% or less.

Mn is present homogeneously as a solid solution in the main component grains of the dielectric ceramic, thereby allowing the insulation properties in the main component grains 11 to be improved. In this case, the ratio of the area of the R/M region 12 on a cross section of the main component grain 11 is only 10% or less, thus allowing local grain growth to be suppressed on firing. Therefore, even when the laminated ceramic capacitor is reduced in thickness, high reliability can be achieved, and in particular, favorable lifetime characteristics in a load test can be achieved.

When the content ratio of Mn is 0.01 to 1 mol % with respect to all of (Ti, Mn) sites, the lifetime characteristic can be further improved.

In addition, when the dielectric ceramic contains (Ba, Ca) (Ti, Mn)$O_3$ as its main component, that is, when Ca is present as a solid solution at Ba sites, the action of suppressing the local grain growth is further enhanced, and the reliability is further improved. When the Ca content ratio is 15 mol % or less with respect to all of (Ba, Ca) sites, the lifetime characteristic can be further improved.

In order to produce a raw material for the dielectric ceramic, a Ba(Ti, Mn)$O_3$ or (Ba, Ca) (Ti, Mn)$O_3$ based main component powder is first produced. For example, a solid-phase synthesis method is applied in such a way that compound powders containing constituent elements for the main component, such as powders of oxides, carbides, chlorides, and metallic organic compounds, are mixed at predetermined ratios and calcined. The grain diameters of the obtained main component powder are controlled by controlling, for example, the calcination temperature. It is to be noted that a hydrothermal synthesis method or a hydrolysis method may be applied instead of the solid-phase synthesis method.

On the other hand, compound powders containing each of R, M and Si accessory components, such as powders of oxides, carbides, chlorides, and metallic organic compounds, are prepared. Then, these accessory component powders are mixed with the main component powder at predetermined ratios, thereby giving a raw material powder for the dielectric ceramic.

In order to manufacture the laminated ceramic capacitor 1, the dielectric ceramic raw material powder obtained as described above is used to produce a ceramic slurry, ceramic green sheets are formed with the ceramic slurry, a conductive paste is applied to the sheets, and multiple ceramic green sheets are stacked, thereby forming a raw laminate to serve as the capacitor main body 5, and a step of firing the raw laminate is carried out. In this step of firing the raw laminate, the dielectric ceramic raw material powder blended as described above is fired, thereby forming the dielectric ceramic layers 2 composed of the sintered dielectric ceramic.

While, for example, the dielectric ceramic raw material powder, a binder, and an organic solvent are mixed with balls in a ball mill in order to produce the ceramic slurry, the solid solution region with R and/or M present therein in the main component grains of the sintered dielectric ceramic, that is, the ratio of the area of the R/M region, can be controlled by adjusting the diameters of the milling balls used in this step. Of course, methods other than the control of the ball diameters, for example, a method of adjusting the mixing time may also be used in order to control the ratio of the area of the R/M region.

Experimental examples carried out in accordance with the invention will be described below.

EXPERIMENTAL EXAMPLE 1

In Experimental Example 1, dielectric ceramics containing Ba(Ti, Mn)$O_3$ as a main component and having varied areas of the R/M region were evaluated.

(A) Production of Ceramic Raw Material

First, respective powders of fine $BaCO_3$, $TiO_2$, and $MnCO_3$ were prepared as starting materials for the main component, weighed to provide a Ba(Ti$_{0.995}$Mn$_{0.005}$)$O_3$ composition, and mixed with water as a medium in a ball mill for 8 hours. Then, evaporative drying was carried out, and calcination was carried out at a temperature of 1100° C. for 2 hours, thereby giving a main component powder.

Next, respective powders of $Y_2O_3$, $V_2O_5$ and $SiO_2$ to serve as accessory components were prepared, and weighed so that 1.0 part by mol of Y as R, 0.25 parts by mol of V as M and 1.5 parts by mol of Si were present with respect to 100 parts by mol of the main component and blended with the main component powder, followed by mixing with water as a medium in a ball mill for 24 hours. Then, evaporative drying was carried out, thereby giving a dielectric ceramic raw material powder.

(B) Production of Laminated Ceramic Capacitor

To the ceramic raw material powder, a polyvinyl butyral based binder and ethanol were added, followed by wet mixing in a ball mill for 16 hours to produce a ceramic slurry. In this step of mixing in a wet manner in the ball mill, the balls used were changed to have diameters of 2 mm, 1.5 mm, 1 mm, 0.8 mm, 0.6 mm, 0.5 mm, and 0.3 mm, respectively, for samples 101, 102, 103, 104, 105, 106, and 107, thereby changing the ratio of the area of the region with R (=Y) and/or M (=V) therein in main component grains of a sintered dielectric ceramic obtained in a subsequent firing step, that is, the "Ratio of Area of R/M region" as shown in Table 1.

Next, this ceramic slurry was formed into the shape of a sheet by a lip method, thereby creating ceramic green sheets.

Next, a conductive paste mainly containing Ni was screen-printed on the ceramic green sheets to form conductive paste films to serve as internal electrodes.

The multiple ceramic green sheets with the conductive paste films formed them were then stacked so that the drawn ends of the conductive paste films were alternately arranged, thereby giving a raw laminate to serve as a capacitor main body.

Next, the raw laminate was heated to a temperature of 300° C. in an $N_2$ atmosphere to burn out the binder, and then fired at a temperature of 1200° C. for 2 hours in a reducing atmosphere composed of an $H_2$—$N_2$—$H_2O$ gas with an oxygen partial pressure of $10^{-10}$ MPa, thereby giving a sintered capacitor main body.

Next, a Cu paste containing $B_2O_3$—$Li_2O$—$SiO_2$—$BaO$ based glass frit was applied on the opposite end surfaces of the sintered capacitor main body, and fired at a temperature of 800° C. in an $N_2$ atmosphere to form external electrodes electrically connected to the internal electrodes, and thereby form a laminated ceramic capacitor samples.

The thus obtained laminated ceramic capacitors had outer dimensions of 2.0 mm in length, 1.2 mm in width, and 1.0 mm in thickness, and the dielectric ceramic layers interposed between the internal electrodes had a thickness of 1.0 μm. The number of the effective dielectric ceramic layers was 100, whereas the area of the internal electrode opposed per ceramic layer was 1.4 $mm^2$.

(C) Structural Analysis and Characterization of Ceramic

For the laminated ceramic capacitors thus obtained, the ceramic structure was observed and analyzed on a cross section of the dielectric ceramic layer. In the observation and analysis, the EDX element mapping analysis in accordance with a STEM mode was carried out in a field of view including approximately 20 grains to calculate the ratio of the solid solution area for the Y (=R) and/or V (=M) component as a subsequently added accessory component in the grains, and to obtain the average value for the ratio (i.e., the percentage) of the solid solution area in the field of view. The results are shown in the column of "Ratio of Area of R/M region" in Table 1. It is to be noted that in the mapping analysis, the probe diameter was 2 nm, whereas the accelerating voltage was 200 kV.

In addition, a high temperature load life test was carried out on the laminated ceramic capacitors thus obtained. In the high temperature load life test, a direct current voltage of 12 V (with an electric field intensity of 12 kV/mm) was applied to 100 samples at a temperature of 125° C., and a sample was regarded as defective when the insulation resistance value was deceased to 100 kΩ or less before a lapse of 1000 hours or 2000 hours, thereby giving the number of defectives. The results are shown in the column of "Number of Defectives in High Temperature Load Life Test" in Table 1.

TABLE 1

| Sample Number | Ratio of Area of R/M region | Number of Defectives in High Temperature Load Life Test | |
|---|---|---|---|
| | | 1000 hours | 2000 hours |
| 101 | 0 | 0/100 | 0/100 |
| 102 | 3.5 | 0/100 | 0/100 |
| 103 | 10 | 0/100 | 0/100 |
| 104 | 12 | 1/100 | 2/100 |
| 105 | 19 | 3/100 | 4/100 |
| 106 | 22 | 5/100 | 6/100 |
| 107 | 61 | 7/100 | 9/100 |

As can be seen from Table 1, for samples 101 to 103 which had a "Ratio of Area of R/M region" of 10% or less, no detectives were formed in the high temperature load life test, not only after a lapse of 1000 hours but also after a lapse of 2000 hours.

On the other hand, for samples 104 to 107 having a "Ratio of Area of R/M region" over 10%, defective(s) were present after a lapse of 1000 hours in the high temperature load life test.

It is determined from these results that favorable reliability can be obtained when the main component is $Ba(Ti, Mn)O_3$ and the "Ratio of Area of R/M region" is 10% or less.

EXPERIMENTAL EXAMPLE 2

In Experimental Example 2, a dielectric ceramic was evaluated containing $Ba(Ti, Mn)O_3$ as a main component as in the case of Experimental Example 1 with the Mn content ratio being varied.

(A) Production of Ceramic Raw Material

A dielectric ceramic raw material powder was obtained in the same way as in the case of Experimental Example 1, expect that the composition of $Ba(Ti_{1-x/100}Mn_{x/100})O_3$ as a main component powder was adjusted so that the content ratio x of Mn at (Ti, Mn) sites had values shown in the column "x" in Table 2.

(B) Production of Laminated Ceramic Capacitor

The dielectric ceramic raw material powder was used to manufacture laminated ceramic capacitors in the same way as in the case of Experimental Example 1. It is to be noted that in the step of wet mixing in a ball mill, balls 1.5 mm in diameter were used to mix the powders for 16 hours, as in the case of sample 102 in Experimental Example 1.

(C) Structural Analysis and Characterization of Ceramic

The ceramic structure analysis carried out in the same way as in the case of Experimental Example 1 resulted in the "Ratio of Area of R/M region" being around 3.5% for all of samples 201 to 208.

In addition, the high temperature load life test was carried out in the same way as in the case of Experimental Example 1. The results are shown in the column of "Number of Defectives in High Temperature Load Life Test" in Table 2.

TABLE 2

| Sample No. | x | Number of Defectives in High Temperature Load Life Test | |
|---|---|---|---|
| | | 1000 hours | 2000 hours |
| 201 | 0.55 | 0/100 | 0/100 |
| 202 | 0.64 | 0/100 | 0/100 |
| 203 | 0.70 | 0/100 | 0/100 |
| 204 | 0.32 | 0/100 | 0/100 |
| 205 | 0.01 | 0/100 | 0/100 |

TABLE 2-continued

| Sample | | Number of Defectives in High Temperature Load Life Test | |
|---|---|---|---|
| No. | x | 1000 hours | 2000 hours |
| 206 | 1.00 | 0/100 | 0/100 |
| 207 | 1.10 | 0/100 | 2/100 |
| 208 | 1.30 | 0/100 | 3/100 |

As can be seen from Table 2, no detectives were formed in the high temperature load life test for samples 201 to 206 with the content ratio "x" of Mn in the range of 0.01 to 1.0, not only after a lapse of 1000 hours but also after a lapse of 2000 hours.

On the other hand, defectives were present after a lapse of 2000 hours in the high temperature load life test for samples 207 and 208 with a content ratio "x" of Mn, outside the range of 0.01 to 1.0, although no defectives were present after a lapse of 1000 hours.

It is determined from these results that higher reliability can be obtained when the Mn content ratio "x" falls within the range of 0.01 to 1.0.

EXPERIMENTAL EXAMPLE 3

In Experimental Example 3, the influences of the impurities were evaluated while using $Ba(Ti, Mn)O_3$ as a main component in the same way as in the case of Experimental Example 1.

In the process of manufacturing a laminated ceramic capacitor such as the production of the raw material, there is a possibility that Sr, Zr, Hf, Zn, Na, Ag, Pd, Ni, and the like are introduced as impurities into the dielectric ceramic, and present in crystal grains and at crystal grain boundaries between the crystal grains. In addition, there is a possibility that the component of internal electrodes is diffused and present in crystal grains of the dielectric ceramic and at crystal grain boundaries between the crystal grains, for example, during the step of firing a laminated ceramic capacitor. Experimental Example 3 is intended to evaluate the influences of these impurities.

(A) Production of Ceramic Raw Material

A dielectric ceramic raw material powder was obtained in the same way as in the case of Experimental Example 1, expect that impurity components shown in Table 3 were added to 100 parts by mol of the dielectric ceramic raw material obtained in Experimental Example 1, so as to provide the content amounts shown in Table 3.

(B) Production of Laminated Ceramic Capacitor

The dielectric ceramic raw material powder was used to manufacture laminated ceramic capacitor samples in the same way as in the case of Experimental Example 1. It is to be noted that in the step of mixing in a wet manner in a ball mill, 1.5 mm diameter balls were used to mix the powders for 16 hours, as in the case of sample 102 in Experimental Example 1.

(C) Structural Analysis and Characterization of Ceramic

The ceramic structure analysis carried out in the same way as in the case of Experimental Example 1 resulted in the "Ratio of Area of R/M region" of around 3.5% for all of samples 301 to 310.

In addition, the high temperature load life test was carried out in the same way as in the case of Experimental Example 1. The results are shown in the column of "Number of Defectives in High Temperature Load Life Test" in Table 3.

TABLE 3

| | Impurity Components | | Number of Defectives in High Temperature Load Life Test | |
|---|---|---|---|---|
| Sample Number | Details | Content (Parts by Mol) | 1000 hours | 2000 hours |
| 301 | 0.4Hf, 0.1Ag | 0.50 | 0/100 | 0/100 |
| 302 | 0.25Sr, 0.02Zn | 0.27 | 0/100 | 0/100 |
| 303 | 0.1Zr, 0.07Zr, 0.01Ag | 0.18 | 0/100 | 0/100 |
| 304 | 0.5Zr, 0.05Ni, 0.1Zn | 0.65 | 0/100 | 0/100 |
| 305 | 0.2Zr, 0.1Na | 0.30 | 0/100 | 0/100 |
| 306 | 0.5Ni, 0.02Hf, 0.02Ag | 0.54 | 0/100 | 0/100 |
| 307 | 0.4Pd, 0.01Zn, 0.03Na | 0.44 | 0/100 | 0/100 |
| 308 | 5.0Ni | 5.00 | 0/100 | 0/100 |
| 309 | 1.2Ag, 1.5Zr | 4.30 | 0/100 | 0/100 |
| 310 | 1.8Ni, 0.1Zr | 1.90 | 0/100 | 0/100 |

As can be seen from Table 3, no detectives were present in each of samples 301 to 310 containing impurities in the high temperature load life test, not only after a lapse of 1000 hours but also after a lapse of 2000 hours, and the samples exhibited excellent reliability.

EXPERIMENTAL EXAMPLE 4

Experimental Example 4 corresponds to Experimental Example 1. The main component was $Ba(Ti, Mn)O_3$ in Experimental Example 1, whereas the main component is $(Ba, Ca)(Ti, Mn)O_3$ in Experimental Example 4.

(A) Production of Ceramic Raw Material

First, respective fine powders of $BaCO_3$, $CaCO_3$, $TiO_2$, and $MnCO_3$ were prepared as starting materials for the main component, weighed to provide $(Ba_{0.99}Ca_{0.01})(Ti_{0.995}Mn_{0.005})O_3$, and mixed with water as a medium in a ball mill for 8 hours. Then, evaporative drying was carried out, and calcination was carried out at a temperature of 1100° C. for 2 hours, thereby giving a main component powder.

Next, respective powders of $Y_2O_3$, $V_2O_5$ and $SiO_2$ to serve as accessory components were prepared, and weighed so that 1.0 part by mol of Y, 0.25 parts by mol of V and 1.5 parts by mol of Si were present with respect to 100 parts by mol of the main component and blended with the main component powder, followed by mixing with water as a medium in a ball mill for 24 hours. Then, evaporative drying was carried out, thereby giving a dielectric ceramic raw material powder.

(B) Production of Laminated Ceramic Capacitor

To the ceramic raw material powder, a polyvinyl butyral based binder and ethanol were added, followed by wet mixing in a ball mill for 16 hours to produce a ceramic slurry. In this step of mixing in a wet manner in the ball mill for 16 hours, the balls used were changed to have diameters of 2 mm, 1.5 mm, 1 mm, 0.8 mm, 0.6 mm, 0.5 mm, and 0.3 mm, respectively, for samples 401, 402, 403, 404, 405, 406, and 407, thereby changing the "Ratio of Area of R/M region" in main component grains of a sintered dielectric ceramic obtained in a subsequent firing step, as shown in Table 4.

Then, the same steps as in the case of Experimental Example 1 were carried out to obtain laminated ceramic capacitors as samples.

(C) Structural Analysis and Characterization of Ceramic

For the laminated ceramic capacitors obtained, the "Ratio of Area of R/M region" was obtained in the same way as in the case of Experimental Example 1. The results are shown in Table 4.

In addition, a high temperature load life test was carried out on the laminated ceramic capacitors obtained in the same way as in the case of Experimental Example 1. It is to be noted that the laminated ceramic capacitors were evaluated after a lapse of 3000 hours in addition to after a lapse of 1000 hours and after a lapse of 2000 hours in Experimental Example 4. The results are shown in the column of "Number of Defectives in High Temperature Load Life Test" in Table 4.

TABLE 4

| Sample Number | Ratio of Area of R/M region | Number of Defectives in High Temperature Load Life Test | | |
|---|---|---|---|---|
| | | 1000 hours | 2000 hours | 3000 hours |
| 401 | 0 | 0/100 | 0/100 | 0/100 |
| 402 | 3.4 | 0/100 | 0/100 | 0/100 |
| 403 | 10 | 0/100 | 0/100 | 0/100 |
| 404 | 12.1 | 1/100 | 1/100 | 3/100 |
| 405 | 16.9 | 1/100 | 2/100 | 4/100 |
| 406 | 21.3 | 1/100 | 5/100 | 6/100 |
| 407 | 54.0 | 1/100 | 10/100 | 15/100 |

As can be seen from Table 4, no detective was present in the high temperature load life test, not only after a lapse of 1000 hours and after a lapse of 2000 hours but also after a lapse of 3000 hours, for samples 401 to 403 with the "Ratio of Area of R/M region" of 10% or less.

On the other hand, samples 404 to 407 had a "Ratio of Area of R/M region" of over 10%, and defectives were present after a lapse of 1000 hours in the high temperature load life test.

It is determined from these results that favorable reliability can be obtained when the main component is (Ba, Ca) (Ti, Mn)$O_3$ and when the "Ratio of Area of R/M region" is 10% or less.

EXPERIMENTAL EXAMPLE 5

In Experimental Example 5, a dielectric ceramic was evaluated containing (Ba, Ca) (Ti, Mn)$O_3$ as a main component as in the case of Experimental Example 4 in which the Ca content ratio and Mn content ratio were varied.
(A) Production of Ceramic Raw Material A dielectric ceramic raw material powder was obtained in the same way as in the case of Experimental Example 4, expect that the composition of $(Ba_{1-x/100}Ca_{x/100})(Ti_{1-y/100}Mn_{y/100})O_3$ as a main component powder was adjusted so that the content ratio x of Ca at (Ba, Ca) sites had values shown in the column "x" in Table 5, and the content ratio y of Mn at (Ti, Mn) sites had values shown in the column "y" in Table 5.
(B) Production of Laminated Ceramic Capacitor The dielectric ceramic raw material powder was used to manufacture laminated ceramic capacitor samples in the same way as in the case of Experimental Example 4. It is to be noted that in the step of mixing in a wet manner in a ball mill, balls 1.5 mm in diameter were used to mix the powders for 16 hours, as in the case of sample 402 in Experimental Example 4.
(C) Structural Analysis and Characterization of Ceramic The ceramic structure analysis carried out in the same way as in the case of Experimental Example 4 resulted in the "Ratio of Area of R/M region" of around 3.5% for all of samples 501 to 508.

In addition, the high temperature load life test was carried out in the same way as in the case of Experimental Example 4. The results are shown in the column of "Number of Defectives in High Temperature Load Life Test" in Table 5.

TABLE 5

| Sample Number | x | y | Number of Defectives in High Temperature Load Life Test | | |
|---|---|---|---|---|---|
| | | | 1000 hours | 2000 hours | 3000 hours |
| 501 | 1.00 | 0.50 | 0/100 | 0/100 | 0/100 |
| 502 | 2.40 | 0.70 | 0/100 | 0/100 | 0/100 |
| 503 | 6.40 | 0.64 | 0/100 | 0/100 | 0/100 |
| 504 | 0.01 | 0.90 | 0/100 | 0/100 | 0/100 |
| 505 | 15.0 | 0.70 | 0/100 | 0/100 | 0/100 |
| 506 | 16.2 | 0.50 | 0/100 | 0/100 | 2/100 |
| 507 | 4.10 | 0.01 | 0/100 | 0/100 | 0/100 |
| 508 | 9.50 | 1.00 | 0/100 | 0/100 | 0/100 |
| 509 | 0.60 | 1.10 | 0/100 | 0/100 | 1/100 |
| 510 | 15.5 | 1.30 | 0/100 | 2/100 | 3/100 |

As can be seen from Table 5, samples 501 to 505, 507 and 508 had a content ratio "x" of Ca of 15 or less, and a content ratio "y" of Mn in the range of 0.01 to 1.0. No detective was present in the high temperature load life test, not only after a lapse of 1000 hours but also after a lapse of 2000 hours and further after a lapse of 3000 hours.

On the other hand, sample 506 with the content ratio "x" of Ca over 15, and sample 509 with the content ratio "y" of Mn outside the range of 0.01 to 1.0, had no defectives after a lapse of 1000 hours or after a lapse of 2000 hours, but defectives were present after a lapse of 3000 hours in the high temperature load life test. In addition, sample 510 with the content ratio "x" of Ca over 15, and the content ratio "y" of Mn outside the range of 0.01 to 1.0, had defectives after a lapse of 2000 hours and after a lapse of 3000 hours in the high temperature load life test, although no defective was present after a lapse of 1000 hours.

It is determined from these results that higher reliability can be obtained when the Ca content ratio "x" is 15 or less, and when the Mn content ratio "y" falls within the range of 0.01 to 1.0.

EXPERIMENTAL EXAMPLE 6

In Experimental Example 6, the influences of the impurities were evaluated while using (Ba, Ca) (Ti, Mn)$O_3$ as a main component in the same way as in the case of Experimental Example 4. Experimental Example 6 corresponds to Experimental Example 3 described above.
(A) Production of Ceramic Raw Material A dielectric ceramic raw material powder was obtained in the same way as in the case of Experimental Example 4, expect that impurity components shown in Table 6 were added to 100 parts by mol of the dielectric ceramic raw material obtained in Experimental Example 4, so as to provide the content ratios shown in Table 6.
(B) Production of Laminated Ceramic Capacitor The dielectric ceramic raw material powder was used to manufacture laminated ceramic capacitors as each sample in the same way as in the case of Experimental Example 4. It is to be noted that in the step of wet mixing in a ball mill, 1.5 mm diameter balls were used to mix the powders for 16 hours, as in the case of sample 402 in Experimental Example 4.
(C) Structural Analysis and Characterization of Ceramic The ceramic structure analysis carried out in the same way as in the case of Experimental Example 4 resulted in the "Ratio of Area of R/M region" of around 3.5% for all of samples 601 to 610.

In addition, the high temperature load life test was carried out in the same way as in the case of Experimental Example 4. The results are shown in the column of "Number of Defectives in High Temperature Load Life Test" in Table 6.

TABLE 6

| | Impurity Components | | Number of Defectives in High Temperature Load Life Test | | |
|---|---|---|---|---|---|
| Sample Number | Details | Content (Parts by Mol) | 1000 hours | 2000 hours | 3000 hours |
| 601 | 0.4Hf, 0.1Ag | 0.50 | 0/100 | 0/100 | 0/100 |
| 602 | 0.25Sr, 0.02Zn | 0.27 | 0/100 | 0/100 | 0/100 |
| 603 | 0.1Zr, 0.07Zr, 0.01Ag | 0.18 | 0/100 | 0/100 | 0/100 |
| 604 | 0.5Zr, 0.05Ni, 0.1Zn | 0.65 | 0/100 | 0/100 | 0/100 |
| 605 | 0.2Zr, 0.1Na | 0.30 | 0/100 | 0/100 | 0/100 |
| 606 | 0.5Ni, 0.02Hf, 0.02Ag | 0.54 | 0/100 | 0/100 | 0/100 |
| 607 | 0.4Pd, 0.01Zn, 0.03Na | 0.44 | 0/100 | 0/100 | 0/100 |
| 608 | 5.0Ni | 5.00 | 0/100 | 0/100 | 0/100 |
| 609 | 1.2Ag, 1.5Zr | 4.30 | 0/100 | 0/100 | 0/100 |
| 610 | 1.8Ni, 0.1Zr | 1.90 | 0/100 | 0/100 | 0/100 |

As can be seen from Table 6, no detective was present in the high temperature load life test for each of samples 601 to 610 containing impurities, not only after a lapse of 1000 hours but also after a lapse of 2000 hours and further after a lapse of 3000 hours, and the samples exhibited excellent reliability.

While Y was used for an accessory component R whereas V was used as M for an accessory component in the experimental examples described above, it has been confirmed that substantially the same results are obtained even when La, Ce, Pr, Nd, Sm, Eu, Gd, Tb, Dy, Ho, Er, Tm, Yb, or Lu other than Y is used as R or when Fe, Co, W, Cr, Mo, Cu, Al, or Mg other than V is used as M.

What is claimed is:

1. A dielectric ceramic comprising:
a main component which is one of $Ba(Ti, Mn)O_3$ and $(Ba, Ca)(Ti, Mn)O_3$; and
R, M and Si as accessory components, where R is at least one member selected from the group consisting of La, Ce, Pr, Nd, Sm, Eu, Gd, Tb, Dy, Ho, Er, Tm, Yb, Lu, and Y, and M is at least one member selected from the group consisting of Fe, Co, V, W, Cr, Mo, Cu, Al, and Mg,
wherein the area of a region in which at least one of R and M is present is 10% or less on average of a cross section of each main component grain.

2. The dielectric ceramic according to claim 1, wherein the Mn content is 0.01 to 1 mol % with respect to all of (Ti, Mn) sites.

3. The dielectric ceramic according to claim 2, wherein the Mn content is up to 0.9 mol % with respect to all of (Ti, Mn) sites.

4. The dielectric ceramic according to claim 3, wherein the Mn content is up to 0.7 mol % with respect to all of (Ti, Mn) sites.

5. A laminated ceramic capacitor comprising:
a capacitor main body comprising a plurality of stacked dielectric ceramic layers and a plurality of internal electrodes disposed at different interfaces between the dielectric ceramic layers; and
two external electrodes disposed at positions different from each other on an external surface of the capacitor main body and electrically connected to different internal electrodes,
wherein the dielectric ceramic layers comprise a dielectric ceramic according to claim 4.

6. A laminated ceramic capacitor comprising:
a capacitor main body comprising a plurality of stacked dielectric ceramic layers and a plurality of internal electrodes disposed at different interfaces between the dielectric ceramic layers; and
two external electrodes disposed at positions different from each other on an external surface of the capacitor main body and electrically connected to different internal electrodes,
wherein the dielectric ceramic layers comprise a dielectric ceramic according to claim 3.

7. The dielectric ceramic according to claim 2, wherein the main component is $Ba(Ti, Mn)O_3$.

8. The dielectric ceramic according to claim 7, wherein R comprises Y and M comprises V.

9. A laminated ceramic capacitor comprising:
a capacitor main body comprising a plurality of stacked dielectric ceramic layers and a plurality of internal electrodes disposed at different interfaces between the dielectric ceramic layers; and
two external electrodes disposed at positions different from each other on an external surface of the capacitor main body and electrically connected to different internal electrodes,
wherein the dielectric ceramic layers comprise a dielectric ceramic according to claim 8.

10. A laminated ceramic capacitor comprising:
a capacitor main body comprising a plurality of stacked dielectric ceramic layers and a plurality of internal electrodes disposed at different interfaces between the dielectric ceramic layers; and
two external electrodes disposed at positions different from each other on an external surface of the capacitor main body and electrically connected to different internal electrodes,
wherein the dielectric ceramic layers comprise a dielectric ceramic according to claim 7.

11. The dielectric ceramic according to claim 2, wherein the main component is $(Ba, Ca) (Ti, Mn)O_3$.

12. The dielectric ceramic according to claim 11, wherein the Ca content is 15 mol % or less with respect to all of (Ba, Ca) sites.

13. The dielectric ceramic according to claim 12, wherein the Ca content is 0.6 to 3.4 mol % with respect to all of (Ba, Ca) sites.

14. A laminated ceramic capacitor comprising:
a capacitor main body comprising a plurality of stacked dielectric ceramic layers and a plurality of internal electrodes disposed at different interfaces between the dielectric ceramic layers; and
two external electrodes disposed at positions different from each other on an external surface of the capacitor main body and electrically connected to different internal electrodes,
wherein the dielectric ceramic layers comprise a dielectric ceramic according to claim 13.

15. The dielectric ceramic according to claim 12, wherein R comprises Y and M comprises V.

16. A laminated ceramic capacitor comprising:
a capacitor main body comprising a plurality of stacked dielectric ceramic layers and a plurality of internal electrodes disposed at different interfaces between the dielectric ceramic layers; and
two external electrodes disposed at positions different from each other on an external surface of the capacitor main body and electrically connected to different internal electrodes,
wherein the dielectric ceramic layers comprise a dielectric ceramic according to claim 15.

17. A laminated ceramic capacitor comprising:
a capacitor main body comprising a plurality of stacked dielectric ceramic layers and a plurality of internal electrodes disposed at different interfaces between the dielectric ceramic layers; and
two external electrodes disposed at positions different from each other on an external surface of the capacitor main body and electrically connected to different internal electrodes,
wherein the dielectric ceramic layers comprise a dielectric ceramic according to claim 12.

18. A laminated ceramic capacitor comprising:
a capacitor main body comprising a plurality of stacked dielectric ceramic layers and a plurality of internal electrodes disposed at different interfaces between the dielectric ceramic layers; and
two external electrodes disposed at positions different from each other on an external surface of the capacitor main body and electrically connected to different internal electrodes,
wherein the dielectric ceramic layers comprise a dielectric ceramic according to claim 11.

19. A laminated ceramic capacitor comprising:
a capacitor main body comprising a plurality of stacked dielectric ceramic layers and a plurality of internal electrodes disposed at different interfaces between the dielectric ceramic layers; and
two external electrodes disposed at positions different from each other on an external surface of the capacitor main body and electrically connected to different internal electrodes,
wherein the dielectric ceramic layers comprise a dielectric ceramic according to claim 2.

20. A laminated ceramic capacitor comprising:
a capacitor main body comprising a plurality of stacked dielectric ceramic layers and a plurality of internal electrodes disposed at different interfaces between the dielectric ceramic layers; and
two external electrodes disposed at positions different from each other on an external surface of the capacitor main body and electrically connected to different internal electrodes,
wherein the dielectric ceramic layers comprise a dielectric ceramic according to claim 1.

* * * * *